United States Patent
Yang et al.

(10) Patent No.: US 9,807,737 B2
(45) Date of Patent: Oct. 31, 2017

(54) METHOD FOR RECEIVING CONTROL INFORMATION IN WIRELESS COMMUNICATIONS SYSTEM AND APPARATUS THEREFOR

(71) Applicant: LG ELECTRONICS INC., Seoul (KR)

(72) Inventors: Suckchel Yang, Seoul (KR); Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 28 days.

(21) Appl. No.: 14/759,180

(22) PCT Filed: Jan. 17, 2014

(86) PCT No.: PCT/KR2014/000529
§ 371 (c)(1),
(2) Date: Jul. 2, 2015

(87) PCT Pub. No.: WO2014/112833
PCT Pub. Date: Jul. 24, 2014

(65) Prior Publication Data
US 2015/0341918 A1    Nov. 26, 2015

Related U.S. Application Data

(60) Provisional application No. 61/753,916, filed on Jan. 17, 2013, provisional application No. 61/872,859, (Continued)

(51) Int. Cl.
*H04H 20/71* (2008.01)
*H04W 72/04* (2009.01)
(Continued)

(52) U.S. Cl.
CPC .......... *H04W 72/0406* (2013.01); *H04L 5/00* (2013.01); *H04L 5/001* (2013.01); *H04W 16/32* (2013.01);
(Continued)

(58) Field of Classification Search
CPC ......... H04W 72/0406; H04W 72/0453; H04W 72/005
(Continued)

(56) References Cited

U.S. PATENT DOCUMENTS

2010/0302983 A1    12/2010  McBeath et al.
2011/0075624 A1*   3/2011  Papasakellariou .... H04L 5/0053
                                                          370/329
(Continued)

FOREIGN PATENT DOCUMENTS

CN        102668669       9/2012
EP        2512051         10/2012
(Continued)

OTHER PUBLICATIONS

LG Electronics Inc., "Message2 Location", 3GPP TSG-RAN2 #77, XP050565520, R2-120699, Feb. 2012, 9 pages.
(Continued)

*Primary Examiner* — Derrick Ferris
*Assistant Examiner* — Farhad Ali
(74) *Attorney, Agent, or Firm* — Lee Hong Degerman Kang & Waimey

(57) ABSTRACT

The present invention relates to a wireless communication system. More specifically, a method for enabling a terminal to receive control information in a wireless communications system according to the present invention includes the steps of: constituting PCell and SCell; and monitoring a plurality of expected channels in a search space to receive the control information from a sub-frame #n in SCell, wherein if the
(Continued)

*When CSS is allocated to both PCell (group) and SCell (group), BD timing/duration can be limited or the number of BDs can be distributed in CSS of SCell.

sub-frame #n is included in a particular sub-frame set, the search space includes CSS, or if the sub-frame #n is not included in the particular sub-frame set, the search space includes only USS.

10 Claims, 11 Drawing Sheets

Related U.S. Application Data filed on Sep. 3, 2013, provisional application No. 61/890,348, filed on Oct. 14, 2013, provisional application No. 61/910,110, filed on Nov. 28, 2013.

(51) Int. Cl.

| | | |
|---|---|---|
| *H04W 72/00* | (2009.01) | |
| *H04W 68/00* | (2009.01) | |
| *H04W 16/32* | (2009.01) | |
| *H04W 74/08* | (2009.01) | |
| *H04L 5/00* | (2006.01) | |

(52) U.S. Cl.
CPC ....... *H04W 68/005* (2013.01); *H04W 72/005* (2013.01); *H04W 72/0453* (2013.01); *H04W 74/0833* (2013.01); *H04L 5/0048* (2013.01); *H04L 5/0053* (2013.01)

(58) Field of Classification Search
USPC ........................................... 370/312
See application file for complete search history.

(56) References Cited

U.S. PATENT DOCUMENTS

| | | | |
|---|---|---|---|
| 2011/0134774 A1* | 6/2011 | Pelletier | H04W 52/365 370/252 |
| 2014/0126485 A1* | 5/2014 | Chen | H04L 5/0053 370/329 |

FOREIGN PATENT DOCUMENTS

| | | |
|---|---|---|
| EP | 2779557 | 9/2014 |
| KR | 10-2012-0010188 | 2/2012 |
| KR | 10-2012-0136867 | 12/2012 |
| KR | 10-2012-0139102 | 12/2012 |
| WO | 2011/122852 | 10/2011 |
| WO | 2012/147601 | 11/2012 |
| WO | 2012/177054 | 12/2012 |

OTHER PUBLICATIONS

European Patent Office Application Serial No. 14740832.2, Search Report dated Jul. 18, 2016, 10 pages.
PCT International Application No. PCT/KR2014/000529, Written Opinion of the International Searching Authority dated May 12, 2014, 13 pages.
PCT International Application No. PCT/KR2014/000529, Written Opinion of the International Searching Authority dated May 12, 2014, 11 pages.
State Intellectual Property Office of the People's Republic of China Application Serial No. 201480005185.3, Office Action dated May 2, 2017, 20 pages.

\* cited by examiner

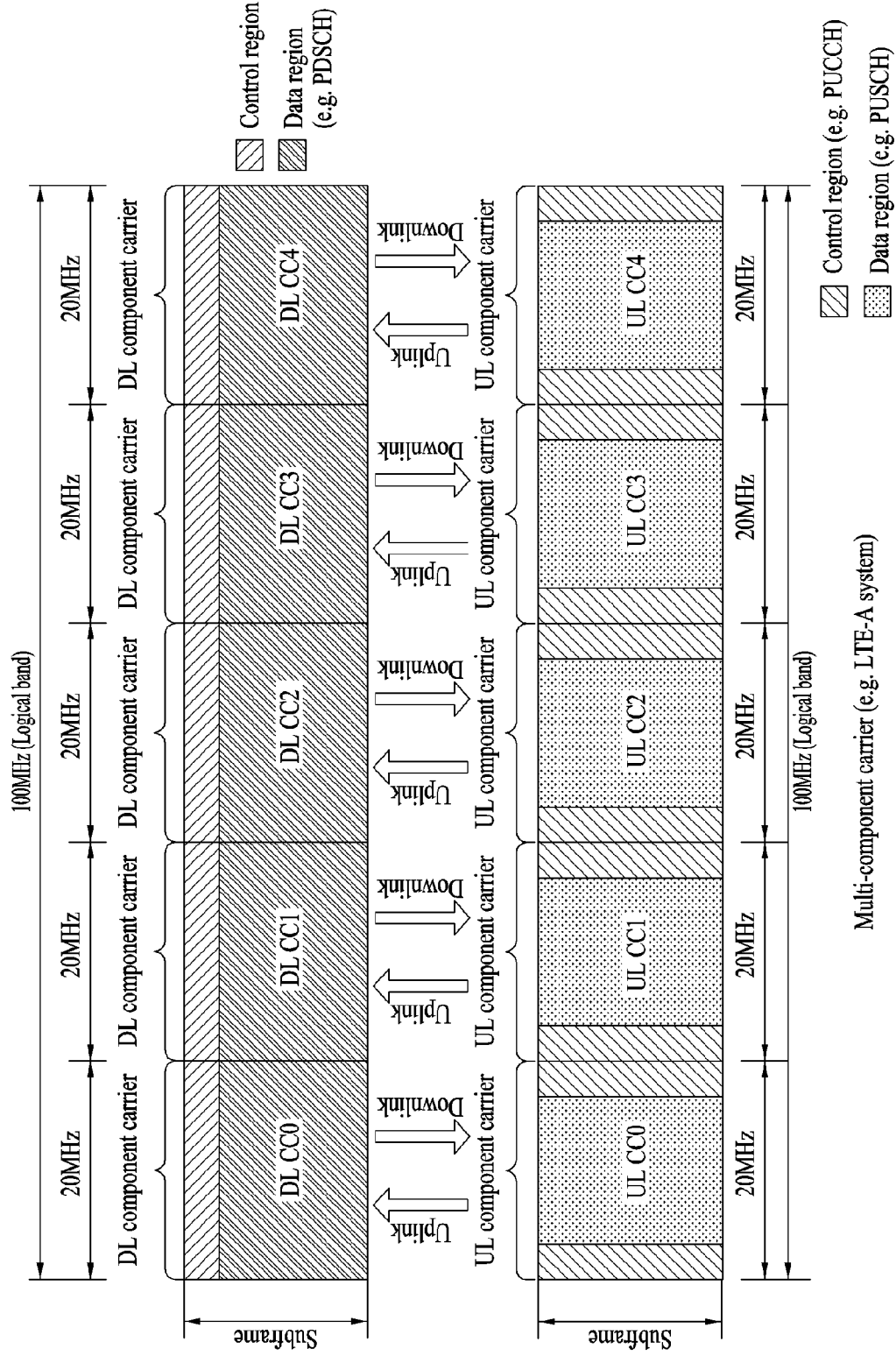

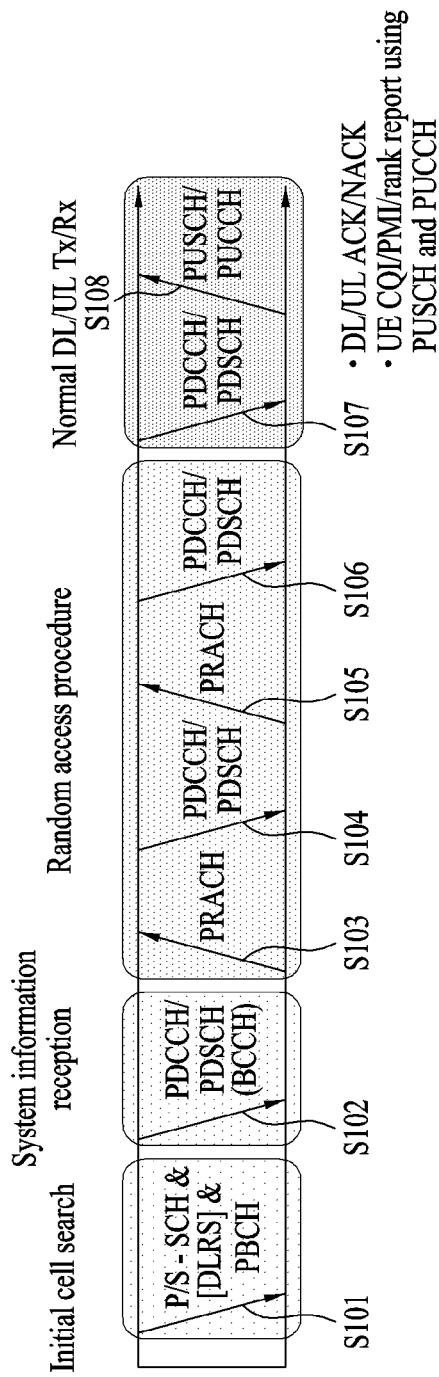

*When CSS is allocated to both PCell (group) and SCell (group), BD timing/duration can be limited or the number of BDs can be distributed in CSS of SCell.

METHOD FOR RECEIVING CONTROL INFORMATION IN WIRELESS COMMUNICATIONS SYSTEM AND APPARATUS THEREFOR

CROSS-REFERENCE TO RELATED APPLICATIONS

This application is the National Stage filing under 35 U.S.C. 371 of International Application No. PCT/KR2014/000529, filed on Jan. 17, 2014, which claims the benefit of U.S. Provisional Application Nos. 61/753,916, filed on Jan. 17, 2013, 61/872,859, filed on Sep. 3, 2013, 61/890,348, filed on Oct. 14, 2013 and 61/910,110, filed on Nov. 28, 2013, the contents of which are all hereby incorporated by reference herein in their entirety.

TECHNICAL FIELD

The present invention relates to a wireless communication system and, more specifically, to a method and apparatus for receiving control information in a carrier aggregation (CA)-based wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method and an apparatus for efficiently transmitting/receiving control information in a CA-based wireless communication system. Specifically, the present invention provides a method for efficiently transmitting/receiving control information in inter-site carrier aggregation (CA) and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

According to one aspect of the present invention, a method for receiving, by a UE, control information in a wireless communication system includes: configuring a primary cell (PCell) and a secondary cell (SCell); and monitoring a plurality of control channel candidates within a search space for receiving the control information in subframe #n in the SCell, wherein, when the subframe #n is included in a specific subframe set, the search space includes a common search space (CSS), wherein, when the subframe #n is not included in the specific subframe set, the search space includes only a user-specific search space (USS).

According to another aspect of the present invention, a UE configured to receive control information in a wireless communication system includes: a radio frequency (RF) unit; and a processor, wherein the processor is configured to configure a primary cell (PCell) and a secondary cell (SCell) and to monitor a plurality of control channel candidates within a search space for receiving the control information in subframe #n in the SCell, wherein, when the subframe #n is included in a specific subframe set, the search space includes a common search space (CSS), wherein, when the subframe #n is not included in the specific subframe set, the search space includes only a user-specific search space (USS).

The specific subframe set may include a plurality of periodically configured subframe patterns.

The specific subframe set may include at least one of the following: (i) a subframe configured to transmit system information in the SCell or a cell group including the SCell; (ii) a subframe configured to transmit a paging signal in the SCell; and (iii) a multicast broadcast single frequency network (MBSFN) subframe in the SCell.

The specific subframe set may include at least one of the following: (i) a subframe configured not to transmit system information in the PCell; (ii) a subframe configured not to transmit a paging signal in the PCell; and (iii) a non-MBSFN subframe in the PCell.

The specific subframe set may include a random access response (RAR) window for a physical random access channel (PRACH) signal transmitted from the SCell or the cell group including the SCell.

When subframe #n is included in the specific subframe set, a process of monitoring at least part of a plurality of control channel candidates in the CSS may be skipped in subframe #n in the PCell. When subframe #n is not included in the specific subframe set, a plurality of control channel candidates in the CSS and the USS may be monitored in subframe #n in the PCell.

When subframe #n is included in the specific subframe set, a process of monitoring a plurality of control channel candidates carrying downlink control information (DCI) format 1C may be skipped in subframe #n in the PCell.

Advantageous Effects

According to the present invention, it is possible to efficiently transmit/receive control information in a CA-based wireless communication system. Specifically, it is possible to efficiently transmit/receive control information in inter-site CA.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 1A and 1B illustrate a carrier aggregation (CA)-based wireless communication system.

FIG. 2 illustrates physical channels used in LTE(-A) and a signal transmission method using the same.

BEST MODE

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA and employs OFDMA in downlink and SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. And, specific terminologies used in the following description are provided to help the present invention to be understood. The specific terminologies can be modified into a different form within a range not deviating from a technical idea of the present invention.

Figure 1A:
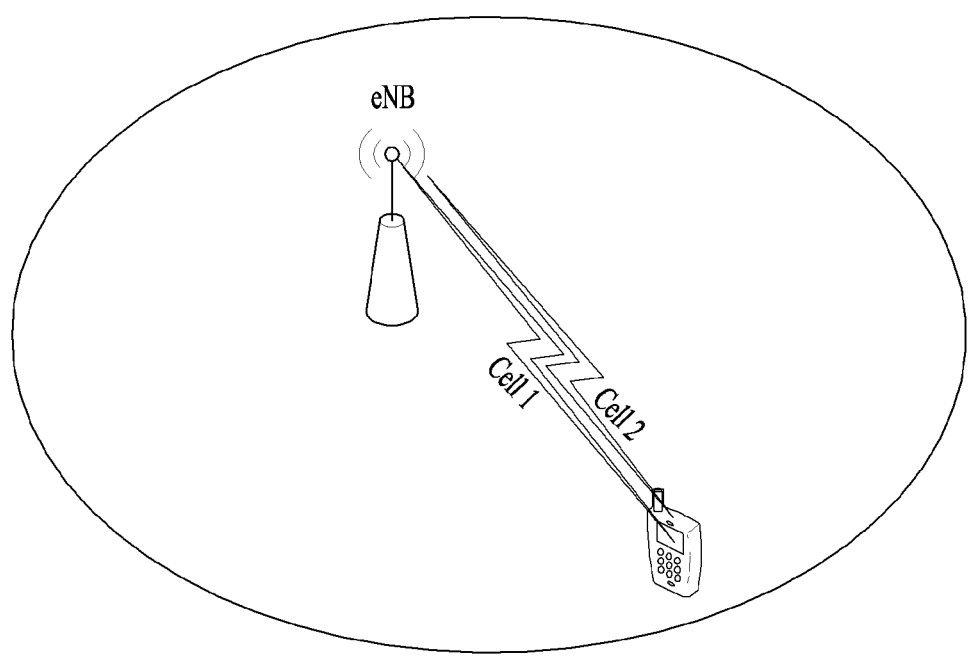

FIGS. 1A and 1B illustrate a conventional carrier aggregation (CA)-based wireless communication system. LTE supports only one DL/UL frequency block, whereas LTE-A provides a wider frequency band by aggregating a plurality of UL/DL frequency blocks. Each frequency block is transmitted using a component carrier (CC). A CC refers to a carrier frequency (or center carrier or center frequency) of a frequency block.

Referring to FIGS. 1A and 1B, a plurality of DL/UL CCs managed by one eNB can be aggregated for one UE. CCs may be contiguous or non-contiguous. The bandwidth of each CC can be independently determined. Asymmetrical carrier aggregation in which the number of UL CCs differs from the number of DL CCs is possible. Even when the entire system bandwidth corresponds to N CCs, a frequency band that can be used by a specific UE can be limited to L (<N) CCs. Various parameters with respect to carrier aggregation can be set cell-specifically, UE group-specifically or UE-specifically. Control information can be set such that the control information is transmitted and received only through a specific CC. Such specific CC may be referred to as a primary CC (PCC) (or anchor CC) and the remaining CCs may be referred to as secondary CCs (SCCs). Since UCI is transmitted only on the PCC, a plurality of PUCCHs is not transmitted through a plurality of UL CCs and transmission of a plurality of PUCCHs on the PCC is not permitted for UE power management. Accordingly, only one PUCCH can be transmitted in one UL subframe in a conventional CA system.

LTE(-A) uses the concept of the cell for radio resource management. The cell is defined as a combination of DL resources and UL resources. The UL resources are not mandatory. Accordingly, the cell can be composed of DL resources only or DL resources and UL resources. When carrier aggregation is supported, linkage between a carrier frequency of a DL resource (or DL CC) and a carrier frequency of a UL resource (or UL CC) can be indicated by system information. A cell operating at a primary frequency (or on a PCC) may be referred to as a primary cell (PCell) and a cell operating at a secondary frequency (or on an SCC) may be referred to as a secondary cell (SCell). The PCell is used to perform initial radio resource control connection establishment or RRC connection reconfiguration. The PCell may refer to a cell indicated during a handover procedure. The SCell can be configured after RRC (Radio Resource Control) is established from an eNB and a UE and used to provide additional radio resources. The PCell and the SCell may be commonly called a serving cell.

Unless separately mentioned, the following description may be applied to each of a plurality of aggregated CCs (or cells). In addition, a CC in the following description may be replaced with a serving CC, serving carrier, cell, serving cell, etc.

FIG. 2 illustrates physical channels used in LTE(-A) and a signal transmission method using the same.

Referring to FIG. 2, when powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure.

Figure 3:
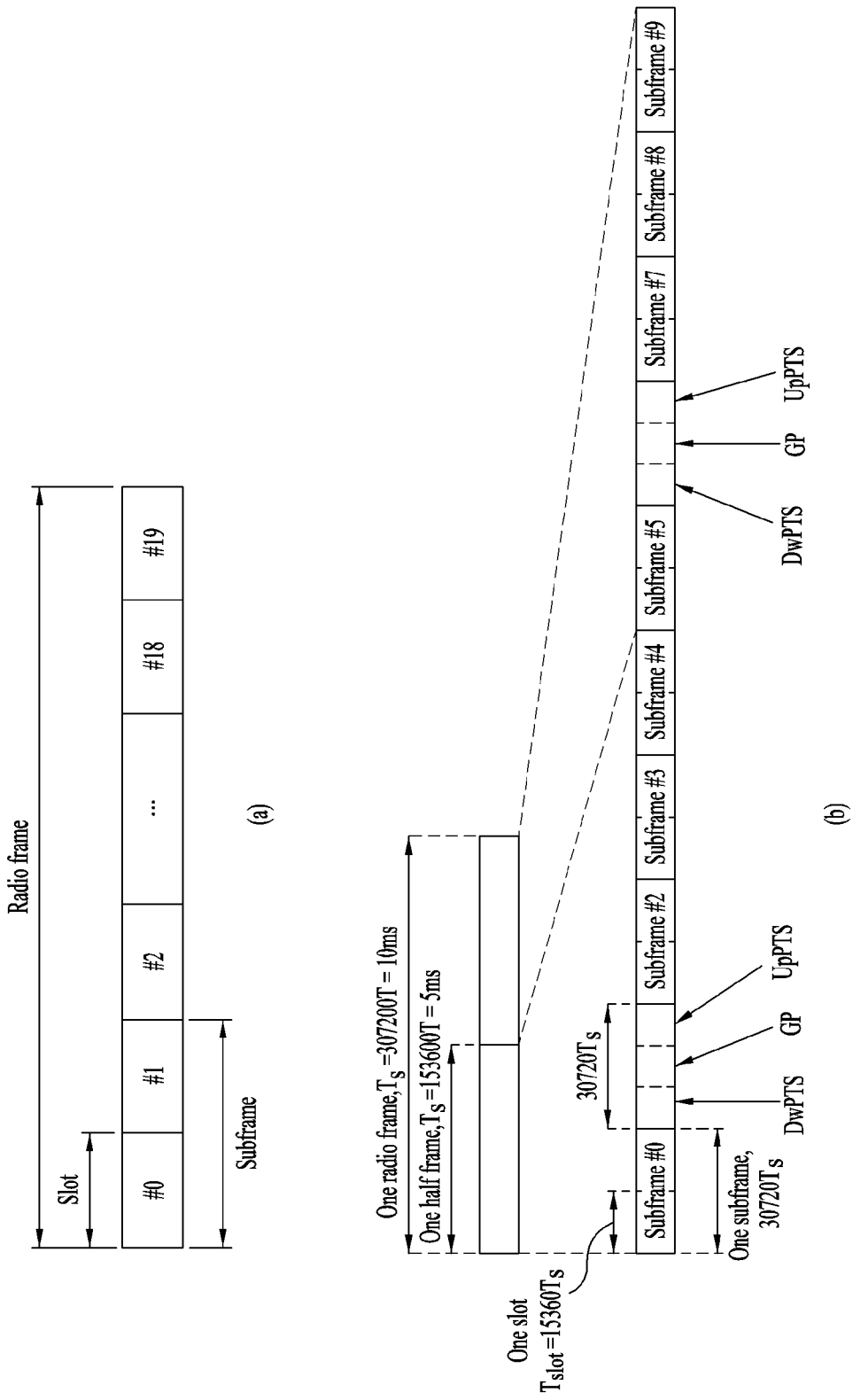
FIG. 3 illustrates the structure of a radio frame.

FIG. 3 illustrates the structure of a radio frame.

FIG. 3(a) illustrates the structure of a type-1 radio frame for frequency division duplex (FDD). A radio frame includes a plurality of (e.g., 10) subframes, and each subframe includes a plurality of (e.g., 2) slots in the time domain. Each subframe may have a length of 1 ms and each slot may have a length of 0.5 ms. A slot includes a plurality of OFDM/SC-FDMA symbols in the time domain and includes a plurality of resource blocks (RBs) in the frequency domain.

FIG. 3(b) illustrates the structure of a type-2 radio frame for time division duplex (TDD). The type-2 radio frame includes 2 half frames, and each half frame includes 5 subframes. One subframe includes 2 slots.

Table 1 shows uplink-downlink configurations (UL-DL Cfgs) of subframes in a radio frame in a TDD mode. UD-cfg is signaled through system information (e.g., system information block (SIB)). For convenience, UD-cfg, which is set through the SIB for a TDD cell, is referred to as SIB-cfg.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes a downlink pilot time slot (DwPTS), a guard period (GP), and an uplink pilot time slot (UpPTS). The DwPTS is a time period reserved for downlink transmission and the UpPTS is a time period reserved for uplink transmission.

Figure 4:
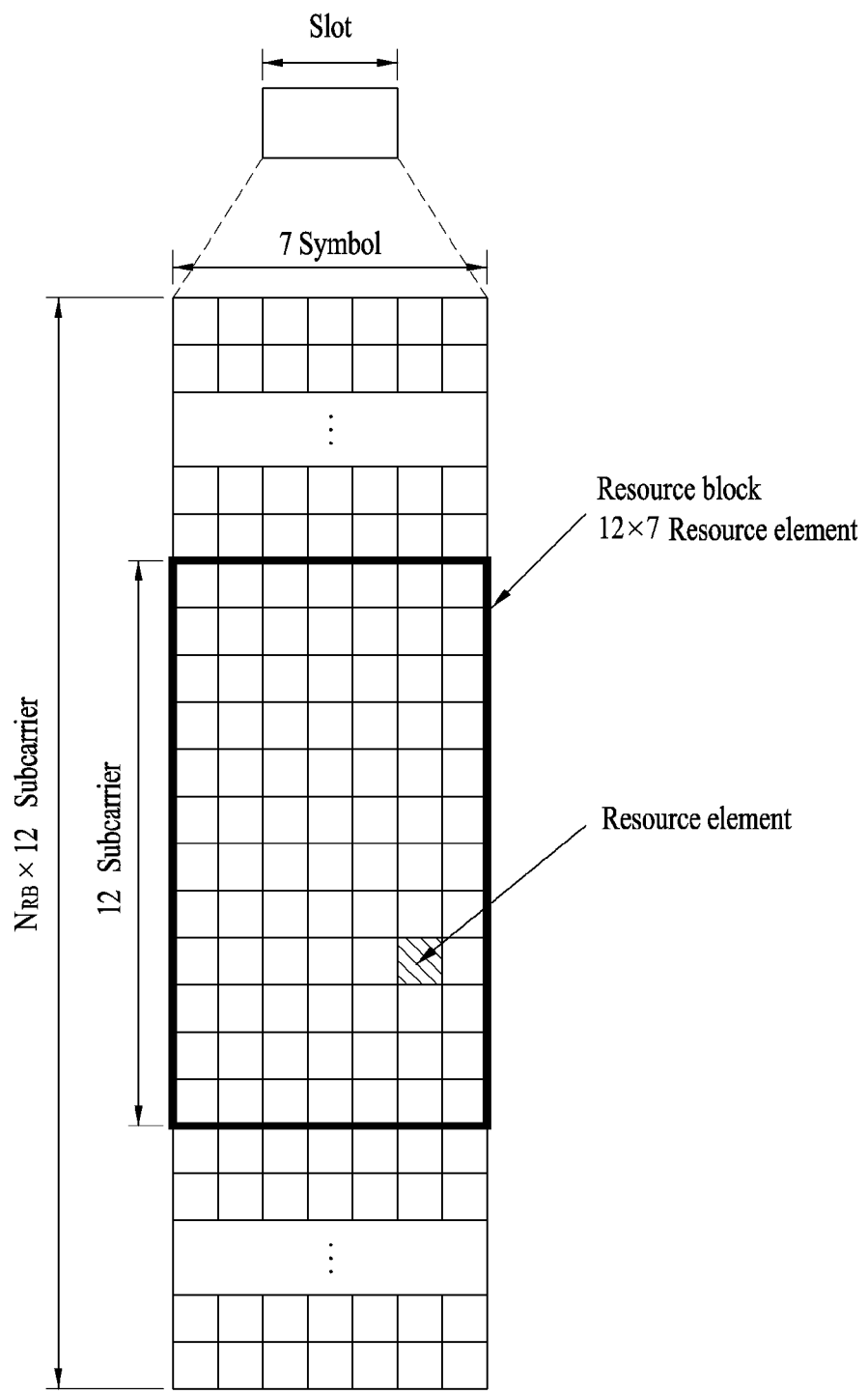
FIG. 4 illustrates a resource grid of a downlink (DL) slot.

FIG. 4 illustrates a resource grid of a DL slot.

Referring to FIG. 4, a DL slot includes a plurality of OFDMA (or OFDM) symbols in the time domain. One DL slot may include 7(6) OFDMA symbols, and one resource block (RB) may include 12 subcarriers in the frequency domain. Each element on the resource grid is referred to as a resource element (RE). One RB includes 12×7(6) REs. The number $N^{RB}$ of RBs included in the DL slot depends on a downlink transmit bandwidth. The structure of a UL slot may be same as that of the DL slot except that OFDMA symbols are replaced by SC-FDMA symbols.

Figure 5:
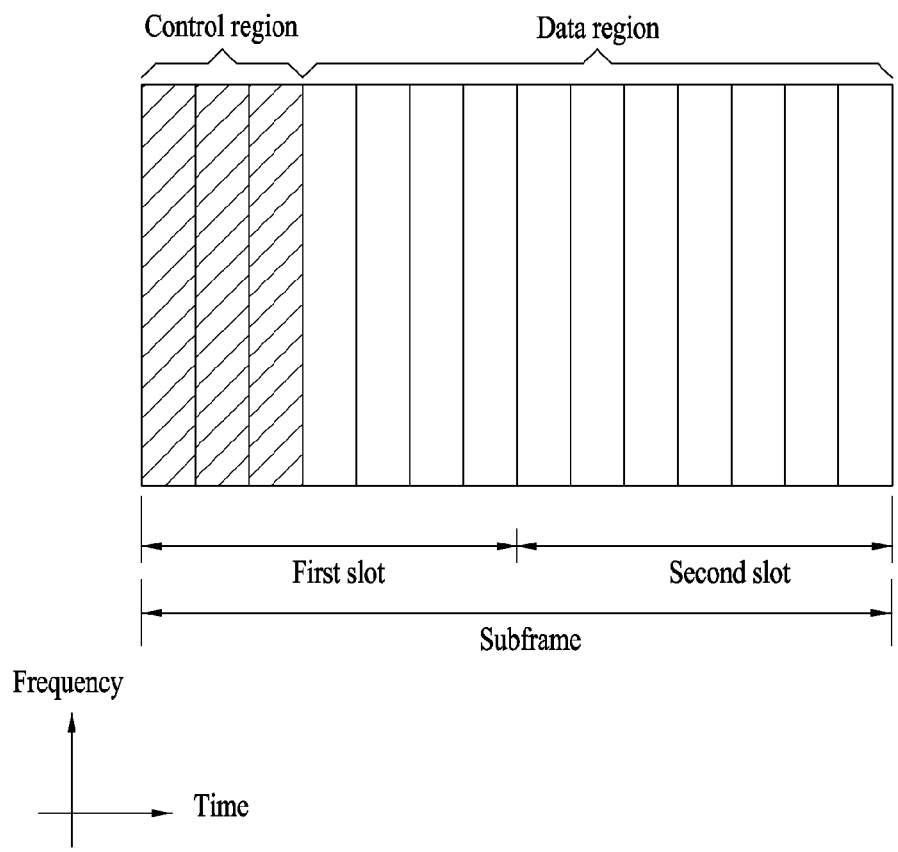
FIG. 5 illustrates the structure of a DL subframe.

FIG. 5 illustrates the structure of a DL subframe.

Referring to FIG. 5, up to 3(4) OFDMA symbols located in a front portion of a first slot within a subframe correspond to a control region to which a control channel is allocated. The remaining OFDMA symbols correspond to a data region to which a physical downlink shared chancel (PDSCH) is allocated. Examples of downlink control channels include a physical control format indicator channel (PCFICH), a physical downlink control channel (PDCCH), a physical HARQ indicator channel (PHICH), etc. The PCFICH is transmitted at a first OFDM symbol of a subframe and carries information regarding the number of OFDMA symbols used for transmission of control channels within the subframe. The PHICH is a response to uplink transmission and carries a HARQ acknowledgement (ACK)/negative acknowledgement (NACK) signal.

A PDCCH may carry a transmission format and resource allocation information of a downlink shared channel (DL-SCH), a transmission format and resource allocation information of an uplink shared channel (UL-SCH), paging information on a paging channel (PCH), system information on the DL-SCH, resource allocation information of an upper-layer control message such as a random access response transmitted on the PDSCH, a set of Tx power control commands on individual UEs within an arbitrary UE group, a Tx power control command, information on activation of a voice over IP (VoIP), etc.

Downlink control information (DCI) is transmitted on a PDCCH. DCI formats 0/4 (hereinafter referred to as UL DCI formats) is defined for UL scheduling (or UL grant), and DCI format 1/1A/1B/1C/1D/2/2A/2B/2C (hereinafter referred to as DL DCI format) is defined for DL scheduling. The DCI format selectively includes information such as hopping flag, RB allocation information, modulation coding scheme (MCS), redundancy version (RV), new data indicator (NDI), transmit power control (TPC), demodulation reference signal (DMRS) cyclic shift, depending on its use. In addition, DCI format 3/3A (referred to as TPC DCI format hereinafter) is defined for uplink signal power control. The TPC DCI format includes bitmap information for a plurality of UEs, and 2-bit information (DCI format 3) or 1-bit information (DCI format 3A) in the bitmap indicates a TPC command for a PUCCH and a PUSCH of a corresponding UE.

A plurality of PDCCHs may be transmitted within a control region. A UE may monitor the PDCCHs in every subframe to check a PDCCH designated to the UE. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A PDCCH coding rate may be controlled according to the number of CCEs (i.e., CCE aggregation level) used for PDCCH transmission. The CCE includes a plurality of resource element groups (REGs). A format of the PDCCH and the number of PDCCH bits are determined according to the number of CCEs. A BS determines a PDCCH format according to DCI to be transmitted to the UE, and attaches a cyclic redundancy check (CRC) to control information. The CRC is masked with an identifier (e.g., radio network temporary identifier (RNTI)) according to an owner or usage of the PDCCH. If the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH relates to an MBMS (Multicast Broadcast Multimedia Service) (e.g., MCCH (Multimedia Control Channel) change notification), M-RNTI(MBMS-RNTI) can be masked to the CRC.

A plurality of PDCCHs may be transmitted in one subframe. Each PDCCH is transmitted using one or more control channel elements (CCEs) and each CCE is composed of 9 REGs. One REG corresponds to 4 REs. The CCE is a logical allocation unit used to provide a coding rate based on radio channel state to a PDCCH. A PDCCH format and the number of PDCCH bits are determined by the number of CCEs (CCE Aggregation Level, AL).

Table 2 shows the number of CCEs, the number of REGs and the number of PDCCH bits according to PDCCH format.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE(-A) defines CCE positions in a limited set in which PDCCHs can be positioned for each UE. CCE positions in a limited set that the UE needs to monitor in order to detect the PDCCH allocated thereto may be referred to as 'search space (SS)'. Here, monitoring includes decoding each PDCCH candidate (blind decoding). A UE-specific search space (USS) and a common search space (CSS) are defined. The USS is set per UE and the CSS is equally set for UEs. The USS and the CSS may overlap. The starting point of the USS is UE-specifically hopped in each subframe. A search space may have a size depending on PDCCH format.

Table 3 shows sizes of the USS and CSS.

TABLE 3

| PDCCH format | Number of CCEs (n) | Number of PDCCH candidates in CSS | Number of PDCCH candidates in USS |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode

Transmission mode 1: Transmission from a single base station antenna port

Transmission mode 2: Transmit diversity

Transmission mode 3: Open-loop spatial multiplexing

Transmission mode 4: Closed-loop spatial multiplexing

Transmission mode 5: Multi-user MIMO (Multiple Input Multiple Output)

Transmission mode 6: Closed-loop rank-1 precoding

Transmission mode 7: Single-antenna port (ports) transmission

Transmission mode 8: Double layer transmission (ports 7 and 8) or single-antenna port (port 7 or 8) transmission Transmission modes 9 and 10: Transmission through up to 8 layers (ports 7 to 14) or single-antenna port (port 7 or 8) transmission DCI Format Format 0: Resource grants for PUSCH transmission Format 1: Resource assignments for single codeword PDSCH transmission (transmission modes 1, 2 and 7)

Format 1A: Compact signaling of resource assignments for single codeword PDSCH (all modes)

Format 1B: Compact resource assignments for PDSCH using rank-1 closed loop precoding (mod 6)

Format 1C: Very compact resource assignments for PDSCH (e.g. paging/broadcast system information)

Format 1D: Compact resource assignments for PDSCH using multi-user MIMO (mode 5)

Format 2: Resource assignments for PDSCH for closed-loop MIMO operation (mode 4)

Format 2A: Resource assignments for PDSCH for open-loop MIMO operation (mode 3)

Format 3/3A: Power control commands for PUCCH and PUSCH with 2-bit/1-bit power adjustments Format 4: Resource grants for PUSCH transmission in a cell set to multi-antenna port transmission mode DCI formats can be classified into a TM-dedicated format and a TM-common format. The TM-dedicated format refers to a DCI format set to only a corresponding TM and the TM-common format refers to a DCI format commonly set to all TMs. For example, DCI format 2B can correspond to the TM-dedicated DCI format in case of TM8, DCI format 2C can correspond to the TM-dedicated DCI format in case of TM9, DCI format 2D can correspond to the TM-dedicated DCI format in case of TM10. DCI format 1A may be the TM-common DCI format.

When multiple cells are aggregated, (a maximum of) Nu blind decoding (BD) operations can be performed for USS corresponding to each cell in order to detect a DL control channel (i.e., PDCCH) for each cell. Nu can be 32 in the case of a cell for which a UL MIMO transmission mode is not set and Nu can be 48 in the case of a cell for which a UL MIMO transmission mode is set. As to a CSS (Common Search Space), (a maximum of) Nc BD operations (e.g., Nc=12) can be performed only in a PCell. Accordingly, when N cells are aggregated for a UE, the UE can perform (a maximum of) (N×Nu+Nc) BD operations. Here, the cell for which a UL MIMO transmission mode is set refers to a cell for which a transmission mode supporting transmission of a maximum of N (N>1) transport blocks is set, and the cell for which a UL MIMO transmission mode is not set refers to a cell for which a transmission mode supporting transmission of a maximum of one transport block is set.

Figure 6:
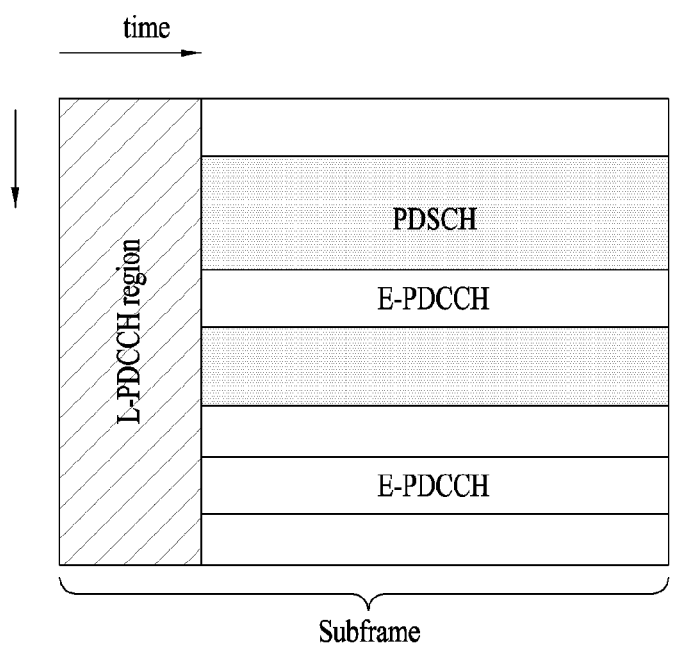
FIG. 6 illustrates an example of Enhanced Physical Downlink Control Channel (EPDCCH).

FIG. 6 illustrates an E-PDCCH. The E-PDCCH is a channel additionally introduced in LTE-A.

Figure 13:
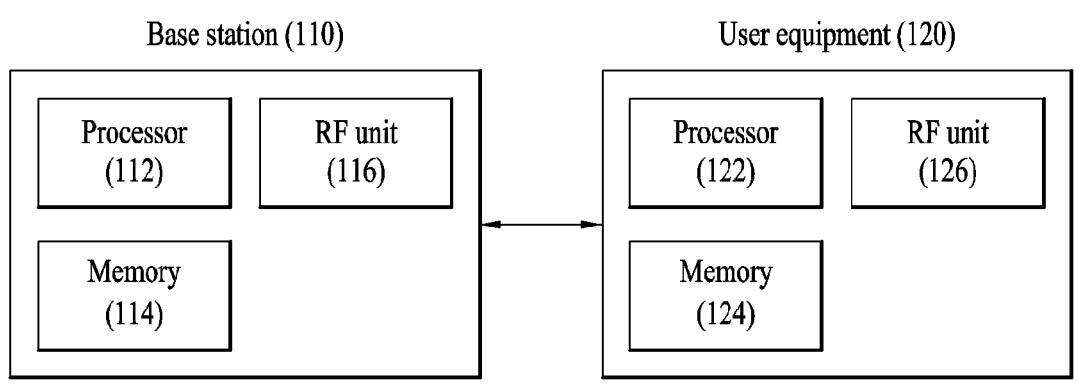
FIG. 13 is a diagram for an example of a base station and a user equipment applicable to the present invention.

Referring to FIG. 13, a PDCCH (referred to as a legacy PDCCH (L-PDCCH)) according to conventional LTE may be allocated to a control region (refer to FIG. 5) of a subframe. In the figure, an L-PDCCH region refers to a region to which the L-PDCCH can be allocated. 한쪽, A PDCCH may be additionally allocated to a data region (e.g. a resource region for a PDSCH). The PDCCH allocated to the data region is referred to as an E-PDCCH. As shown in the figure, control channel resources may be additionally secured through the E-PDCCH to mitigate scheduling restriction due to limited control channel resources of the L-PDCCH region. Like the L-PDCCH, the E-PDCCH carries DCI. For example, the E-PDCCH can carry downlink scheduling information and uplink scheduling information. For example, a UE can receive the E-PDCCH and receive data/control information through a PDSCH corresponding to the E-PDCCH. In addition, the UE can receive the E-PDCCH and transmit data/control information through a PUSCH corresponding to the E-PDCCH. The E-PDCCH/PDSCH can be allocated to a subframe from the first OFDM symbol thereof according to cell type.

The E-PDCCH may be detected/demodulated on the basis of a demodulation reference signal (DM RS). The E-PDCCH is transmitted over a physical resource block (PRB) pair in the time domain. More specifically, a search space (SS) for E-PDCCH detection may be composed of one or more (e.g. 2) E-PDCCH sets. Each E-PDCCH set may occupy a plurality of (e.g. 2, 4 or 8) PRB pairs. Enhanced CCEs (eCCEs) constituting an E-PDCCH set may be mapped in a localized or distributed manner (according to whether one eCCE is dispersed in a plurality of PRB pairs). Furthermore, an AL (Aggregation Level) and the number of E-PDCCH candidates (to be blind-decoded) corresponding to the AL can be defined per E-PDCCH set according to the number (combination) of PRB pairs occupied by each EPDCCH set, the number of OFDM symbols available for E-PDCCH transmission (per subframe) and/or an eCCE mapping method (i.e., localized method or distributed method) of each EPDCCH set. Also, when E-PDCCH scheduling is configured, a subframe in which E-PDCCH transmission/detection will be performed may be designated. The E-PDCCH may be configured in a UE-specific search space (USS) only. A UE may attempt DCI detection only for an L-PDCCH CSS and E-PDCCH USS in a subframe (referred to as E-PDCCH subframe hereinafter) configured to permit the E-PDCCH to be transmitted and attempt DCI detection for the L-PDCCH CSS and L-PDCCH USS in a subframe (i.e. non-E-PDCCH subframe) configured not to permit E-PDCCH transmission.

The E-PDCCH carries DCI like the L-PDCCH. For example, the E-PDCCH may carry downlink scheduling information and uplink scheduling information. An E-PDCCH/PDSCH procedure and an E-PDCCH/PUSCH procedure are equal/similar to the procedures described with reference to steps S107 and S108 of FIG. 1. That is, the UE may receive the E-PDCCH and receive data/control information through a PDSCH corresponding to the E-PDCCH. In addition, the UE may receive the E-PDCCH and transmit data/control information through a PUSCH corresponding to the E-PDCCH. Meanwhile, LTE adopts a scheme in which a PDCCH candidate region (referred to as a PDCCH search space) is reserved in a control region and a PDCCH of a specific UE is transmitted in part of the PDCCH search space. Accordingly, the UE may obtain the PDCCH thereof in the PDCCH search space through blind decoding. Similarly, the E-PDCCH may be transmitted over some or all reserved resources.

Figure 7:
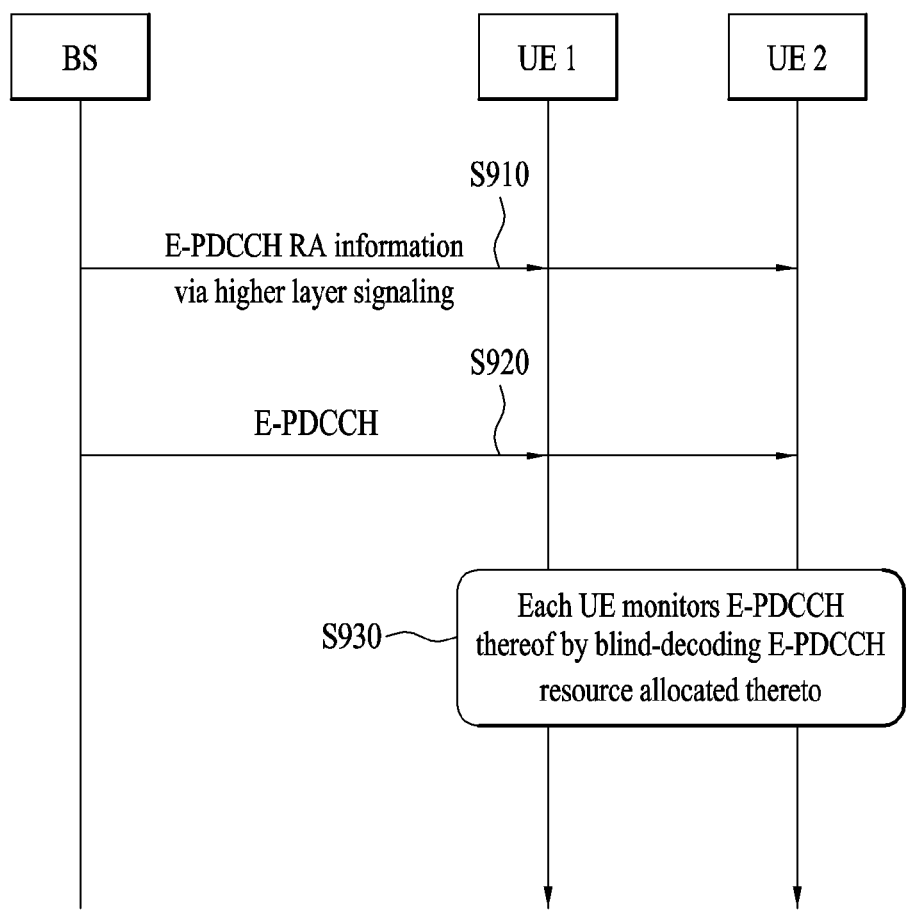
FIG. 7 illustrates a procedure of allocating resources for an E-PDCCH and receiving a PDSCH.

FIG. 7 illustrates a procedure of allocating resources for an E-PDCCH and receiving the E-PDCCH.

Referring to FIG. 7, a BS transmits E-PDCCH resource allocation (RA) information to a UE (S910). The E-PDCCH RA information may include RB (or virtual resource block (VRB)) allocation information. The RB allocation information may be provided on an RB-by-RB basis or RBG-by-RBG basis. An RBG includes two or more consecutive RBs. The E-PDCCH RA information may be transmitted using higher layer (e.g. radio resource control (RRC) layer) signaling. Here, the E-PDCCH RA information is used to reserve E-PDCCH resources (regions) (referred to as an E-PDCCH set hereinafter). The BS transmits the E-PDCCH to the UE (S920). The E-PDCCH may be transmitted in some or all E-PDCCH resources (e.g. M RBs) reserved in step S910. Accordingly, the UE monitors resources (region) (referred to as an E-PDCCH search space hereinafter) in which the E-PDCCH can be transmitted (S930). The E-PDCCH search space may be provided as part of the RB set allocated in step S910. Here, monitoring includes blind decoding of a plurality of E-PDCCH candidates in the search space. Blind decoding may be performed using a scrambling sequence applied to the E-PDCCH.

Figure 8:
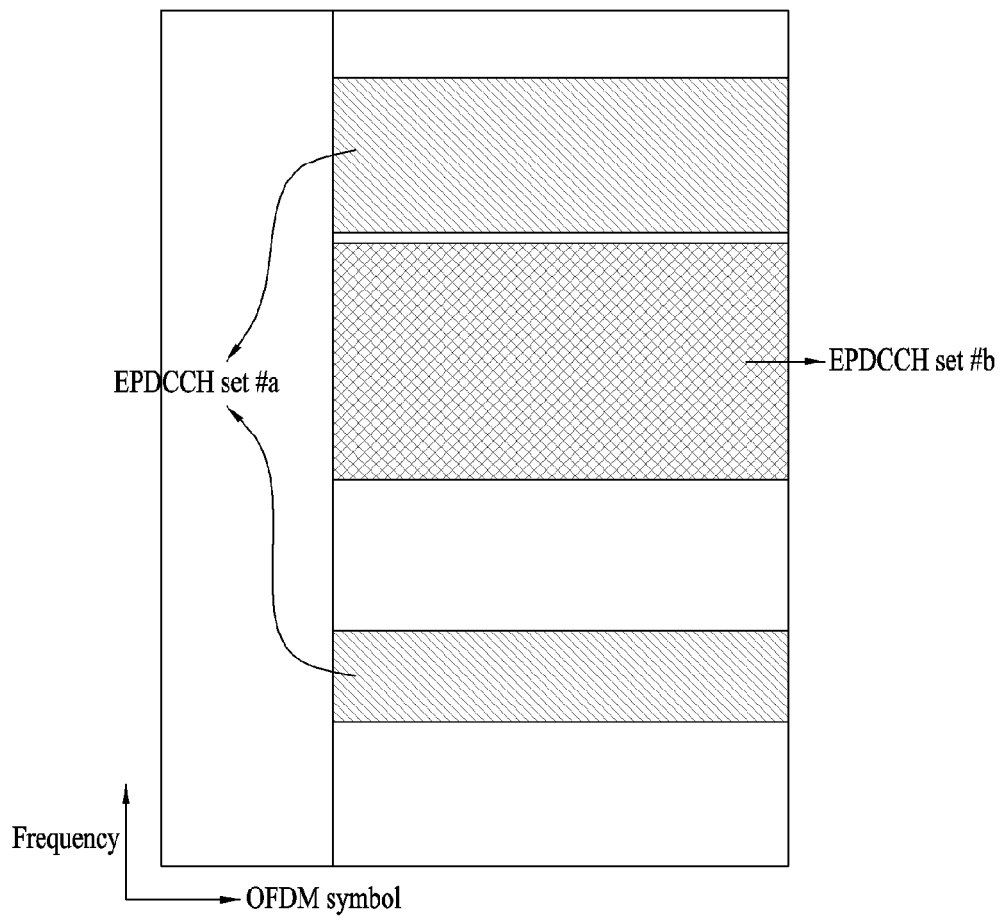
FIG. 8 illustrates an E-PDCCH set.

FIG. 8 illustrates an E-PDCCH set (or E-PDCCH-PRB set).

Referring to FIG. 8, in the case of E-PDCCH, a USS may be composed of K E-PDCCH set(s) per CC/cell for one UE. Here, K may be greater than or equal to 1 and less than or equal to a specific upper limit (e.g. 2). The E-PDCCH set may be composed of N PRB (pairs) (which belong to a PDSCH region). Here, the value N and PRB resources/indices that constitute the E-PDCCH may be independently allocated per E-PDCCH set (i.e. E-PDCCH set-specifically allocated). Accordingly, the number/indices of eCCE resources constituting the E-PDCCH may be (UE-specifically and) E-PDCCH set-specifically configured. For example, eCCEs may be indexed per E-PDCCH set in a subframe (e.g. indexed from 0 per E-PDCCH set). PUCCH resources/indices linked to the eCCE resources/indices may be (UE-specifically and) E-PDCCH set-specifically allocated by setting an independent starting PUCCH resource/index per E-PDCCH set. Here, an eCCE refers to a basic control channel unit (i.e. resource unit) of the E-PDCCH, which is composed of a plurality of REs (belonging to a PRB in a PDSCH region). The eCCE may have a structure depending on E-PDCCH transmission type. For example, an eCCE for localized transmission may be configured using REs belonging to the same PRB pair. An eCCE for distributed transmission may be composed of REs extracted from a plurality of PRB pairs.

In the following description, the PDCCH includes both the L-PDCCH and the E-PDCCH unless otherwise particularly discriminated and can be interpreted as the L-PDCCH or the E-PDCCH according to context.

Then, a description is now given of scheduling when a plurality of CCs (or cells) are configured. If a plurality of CCs are configured, cross-carrier scheduling scheme and non-cross-carrier scheduling (or self scheduling) scheme may be used. The non-cross-carrier scheduling (or self scheduling) scheme is the same as the legacy LTE scheduling scheme.

If cross-carrier scheduling is configured, a DL grant PDCCH may be transmitted in DL CC#0, and a corresponding PDSCH may be transmitted in DL CC#2. Likewise, a UL grant PDCCH may be transmitted in DL CC#0, and a corresponding physical uplink shared channel (PUSCH) may be transmitted in UL CC#4. For cross-carrier scheduling, a carrier indicator field (CIF) is used. Whether a CIF is present in a PDCCH may be determined through higher layer signaling (e.g., RRC signaling) using semi-static and UE-specific (or UE-group-specific) schemes.

Scheduling according to whether a CIF is set may be defined as described below.

CIF disabled: A PDCCH in a DL CC allocates PDSCH resources in the same DL CC or allocates PUSCH resources in one linked UL CC.

CIF enabled: A PDCCH in a DL CC may allocate PDSCH or PUSCH resources in a specific DL/UL CC among a plurality of aggregated DL/UL CCs, using a CIF.

When a CIF is present, a BS may allocate one or more PDCCH monitoring DL CCs (hereinafter referred to as monitoring CCs (MCCs)) to a UE. The UE may detect/decode a PDCCH in the MCCs. That is, if the BS schedules a PDSCH/PUSCH to the UE, a PDCCH is transmitted only in the MCCs. The MCCs may be set using UE-specific, UE-group-specific, or cell-specific scheme. The MCCs include a PCC.

Figure 9:
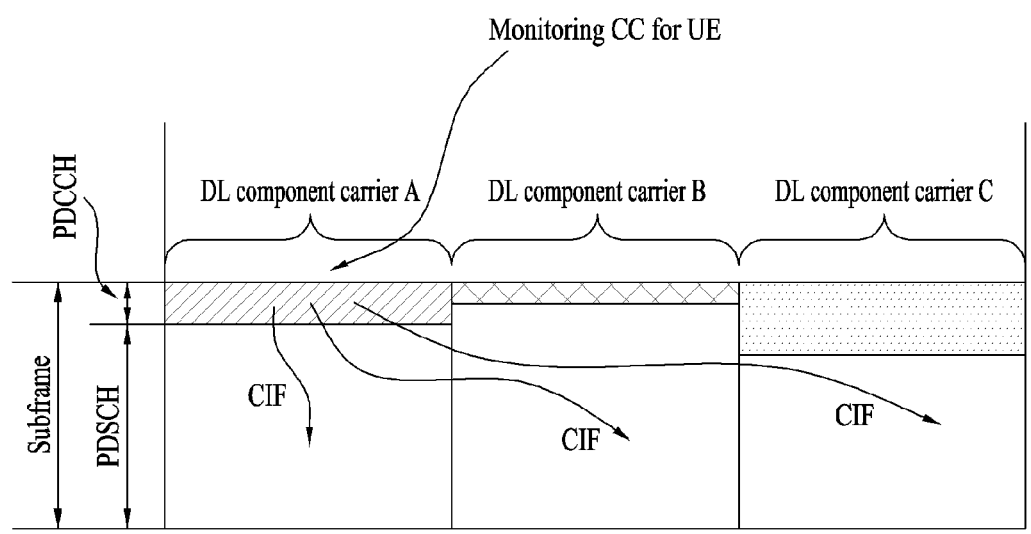
FIG. 9 illustrates cross-carrier scheduling.

FIG. 9 illustrates cross-carrier scheduling. Although DL scheduling is illustrated in FIG. 5, the illustrated scheme is equally applied to UL scheduling. In addition, while the figure shows a case in which the L-PDCCH is used, the cross-carrier scheduling is equally applied to a case in which the E-PDCCH is used.

Referring to FIG. 9, 3 DL CCs may be configured for a UE, and DL CC A may be set as a PDCCH monitoring DL CC (i.e., MCC). If a CIF is disabled, each DL CC may transmit a PDCCH for scheduling its PDSCH without the CIF according to the LTE PDCCH rules. On the other hand, if a CIF is enabled, DL CC A (i.e., MCC) may transmit not only a PDCCH for scheduling its PDSCH but also PDCCHs for scheduling PDSCHs of other CCs, using the CIF. In this example, DL CC B/C transmits no PDCCH.

Figure 10A:
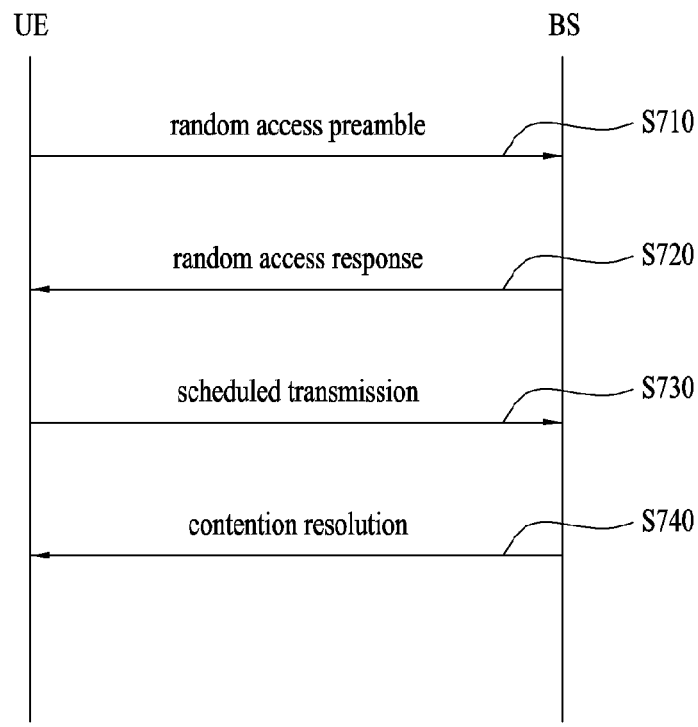
FIGS. 10A and 10B are diagrams for examples of a random access procedure (RACH).

FIG. 10A is a diagram for one example of a contention based random access procedure.

Referring to FIG. 10A, a UE receives information about random access from an eNB through system information. When random access is required, the UE transmits a random access preamble (message 1) to the eNB through a PRACH (S710). Upon reception of the random access preamble from the UE, the eNB transmits a random access response (RAR) message (message 2) to the UE (S720). Downlink scheduling information on the RAR message can be CRC-masked to an RA-RNTI (Random Access-RNTI) and transmitted on an L1/L2 control channel (PDCCH). To receive the RAR signal, the UE monitors whether a PDCCH signal having an RA-RNTI is present in a USS for a RAR window interval starting from a subframe corresponding to (subframe in which the PRACH signal is transmitted)+3 subframes. Upon reception of a PDCCH signal having a CRC scrambled with an RA-RNTI, the UE can receive the RAR message on a PDSCH and decode the RAR message. Then, the UE checks whether the RAR message includes RAR information corresponding thereto. Whether the RAR information corresponding to the UE is present can be checked according to presence or absence of a random access preamble ID (RAID) for the preamble transmitted by the UE. The RAR information includes timing advance (TA) indicating timing offset information for synchronization, radio resource allocation information used for uplink, a temporary identifier for UE identification (e.g., T-CRNTI) and the like. Upon reception of the RAR information, the UE can transmit an uplink message (message 3) on an uplink shared channel (SCH) according to the radio resource allocation information included in the RAR information (S730). The eNB receives the uplink message of S730 from the UE and then transmits a contention resolution message (message 4) to the UE (S740).

Figure 10B:
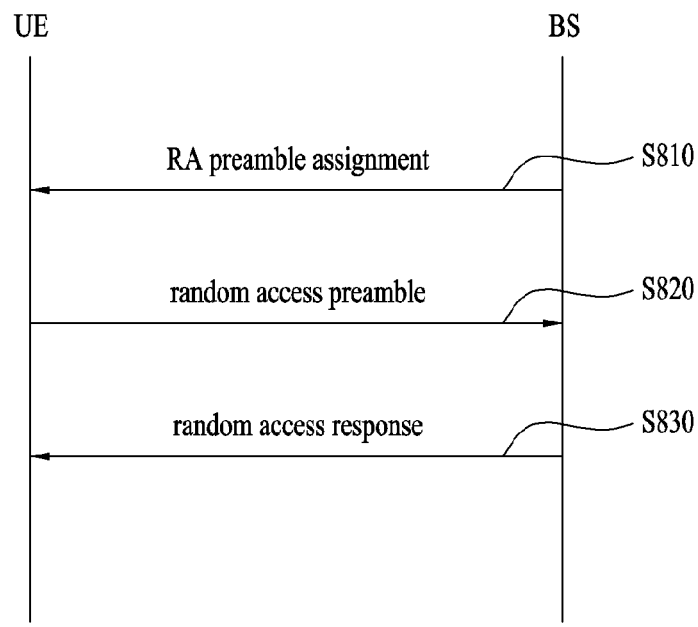

FIG. 10B is a diagram for one example of a non-contention based random access procedure. A non-contention based random access procedure may be used in a handover procedure or may be performed by an order from a base station. A basic procedure is same as a contention based random access procedure.

Referring to FIG. 10B, a user equipment receives assignment of a random access preamble (i.e., a dedicated random access preamble) for the user equipment only from a base station (S810). A dedicated random access preamble indication information (e.g., a preamble index) may be included in a handover command message or may be received on PDCCH. The user equipment transmits the dedicated random access preamble to the base station (S820). Thereafter, the user equipment receives a random access response from the base station (S830) and the random access procedure is ended. A RAR reception procedure is similar to a contention based RACH procedure.

In order to indicate a non-contention based random access procedure with a PDCCH order, DCI format 1A is used. And, the DCI format 1A may be used for compact scheduling for one PDSCH codeword. The following information is transmitted using the DCI format 1A.

Flag for identifying DCI format 0 or DCI format 1A: This flag is 1-bit flag. A flag value '0' indicates DCI format 0 and a flag value '1' indicates DCI format 1A.

If all the fields remaining after scrambling CRC of DCI format 1A with C-RNTI are set as follows, the DCI format 1A may be used for a random access procedure according to a PDCCH order.

Localized/distributed VRB (virtual resource block) assignment flag: This flag is 1-bit flag. This flag is set to 0.

Resource block assignment information: $\lceil \log_2(N^{DL}_{RB}(N^{DL}_{RB}+1)/2) \rceil$. Every bit is set to 1.

Preamble index: 6 bits

PRACH mask index: 4 bits

All the remaining bits for compact scheduling of PDSCH in DCI format 1A are set to 0.

Embodiment: Control Information Transmission When Multiple Cell Groups are Present LTE-A considers management of multiple cells aggregated for one UE by one eNB (intra-site CA) (refer to FIG. 1). In systems following LTE-A, cells (e.g., micro cells) having small coverage may be disposed within a cell (e.g., macro cell) having large coverage for traffic optimization and the like. In this case, the macro cell and the micro cells can be aggregated for one UE, the macro cell can be used for mobility management (e.g. PCell) and the micro cells can be used for throughput boosting (e.g., SCell). Accordingly, cells aggregated for one UE may have different coverages and respectively managed by different eNBs (or nodes corresponding thereto (e.g., relays)) geographically separated (inter-site CA).

Figure 11:
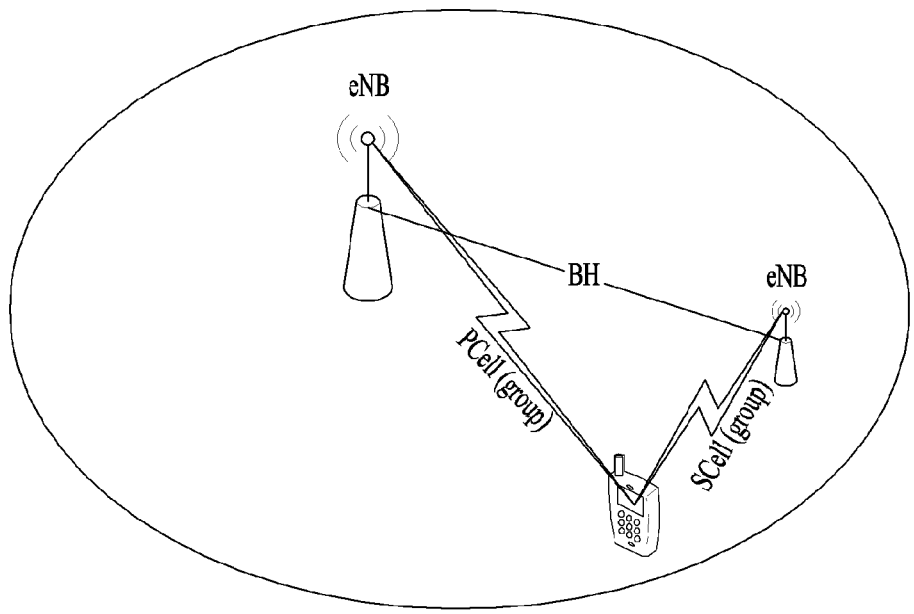
FIG. 11 is a diagram showing inter-site carrier aggregation (CA).

FIG. 11 is a diagram showing inter-site carrier aggregation (CA). Referring to FIG. 11, a method for performing radio resource control and management for a UE (e.g., all functions of RRC and some functions of MAC) at an eNB for managing a PCell (e.g., CC1) and performing data scheduling and feedback with respect to each cell (that is, CC1 or CC2) (e.g., all functions of PHY and main functions of MAC) at each eNB for managing each cell may be considered. Accordingly, in inter-site CA, information/data exchange/delivery between cells (that is, between eNBs) is required. Upon considering a conventional signaling method, in inter-site CA, information/data exchange/delivery between cells (that is, between eNBs) may be performed via a backhaul (BH) link (e.g., a wired X2 interface or a wireless backhaul link). However, when the conventional method is applied without change, cell management stability, resource control efficiency and data transmission adaptation, etc. may be considerably reduced due to latency caused in an inter-eNB signaling procedure.

For example, as shown in FIG. 11, an inter-site CA situation in which a PCell (e.g., CC1) (group) and an SCell (e.g., CC2) (group) aggregated for one UE are respectively managed by eNB-1 and eNB-2 is assumed. In addition, assume that the eNB (that is, eNB-1) for managing the PCell is responsible for managing/performing an RRC function associated with the UE corresponding thereto. At this time, if a radio resource management (RRM) measurement (e.g., reference signal received power (RSRP), reference signal received quality (RSRQ)) report associated with the SCell is not transmitted by the PCell but is transmitted via the SCell (e.g., a PUSCH), eNB-2 may deliver the RRM measurement report to eNB-1 via the BH. In addition, based on the RRM report, for example, if eNB-1 sends an RRC reconfiguration command for releasing the SCell from the CA cell set to the UE via the PCell (e.g., a PDSCH), the UE may transmit a confirmation response to the RRC reconfiguration command via the SCell (e.g., a PUSCH) instead of the PCell. In this case, eNB-2 may deliver the confirmation response to eNB-1 via the BH, etc. Accordingly, in inter-site CA, considerable latency may be caused in an inter-cell (that is, inter-eNB) signaling procedure. Thus, misalignment between the eNB and the UE for CA cell set interpretation may occur and stable/efficient cell resource management and control may not be facilitated.

Since one eNB manages all cells in intra-site CA, per-cell radio resource control/management and common control information delivery, a random access procedure and the like can be performed per cell. In this case, to prevent signaling inconsistency between a UE and an eNB, control information related to per-cell radio resource control/management and common control information delivery, a random access procedure and the like is preferably transmitted through only a specific cell. Accordingly, a CSS used for common control information transmission is allocated to a PCell only in LTE-A. Therefore, a UE performs PDCCH detection operation (i.e., BD) with respect to the CSS only in the PCell in LTE-A. As described above with reference to FIG. 11, however, per-cell radio resource control/management, common control information delivery, a random access procedure and the like are preferably performed per cell (group) in inter-site CA. Accordingly, control information (referred to as common control information) related to per-cell radio resource control/management, common control information delivery, a random access procedure and the like are preferably transmitted through a specific cell per cell group in inter-site CA. To this end, the CSS used to transmit common control information may also be allocated to an SCell in inter-site CA. In this case, there is a need for a method of efficiently performing BD operations for a CSS of the SCell such that the number of BD operations does not exceed a maximum allowable number of BD operations of a UE.

A description will be given of a detailed configuration and operation method for performing BD for a CSS transmitted through an SCell in inter-site CA (or similar situations). The following terms and abbreviations are defined for facilitation of description of the present invention.

PCell CSS: A CSS transmitted through a PCell (or CSS on a PCell)

SCell CSS: A CSS transmitted through an SCell (or CSS on an SCell)

CSS BD: BD operation for a PDCCH candidate in a CSS

ACell: An SCell to which an SCell CSS is allocated (or an SCell through which a CSS is transmitted). One or more ACells can be configured. When an ACell and an SCell are described together in the following description, the SCell can refer to a cell (i.e., normal SCell) having no CSS. In other cases, the SCell may refer to both the ACell and the normal SCell and may be interpreted as the ACell or normal SCell according to context.

CSS cell: This refers to a cell to which a CSS is allocated (or a cell through which a CSS is transmitted). The CSS cell includes a PCell and an ACell and may be interpreted as the PCell or ACell according to context. The CSS cell may be restricted to refer to a cell configured to perform CSS BD from among cells in which the CSS is set, according to context.

PCell group: A cell group including a PCell. The PCell group may be composed of only one PCell or composed of one PCell and one or more SCells. Cells within the PCell group may be managed/controlled by the same eNB. In addition, cells within the PCell group may be composed of cells to which the same TA (Timing Advance) as that of the PCell is applied. (In this case, the PCell group can be referred to as a pTAG (primary Timing Advance Group)). The PCell group does not include an ACell.

SCell group: A cell group composed of an SCell only. The SCell group may be composed of one or more SCells. Cells within the SCell group may be managed/controlled by the same eNB. (In this case, the SCell group can be referred to as an sTAG (secondary TAG)). Further, cells within the SCell group may be composed of cells to which the same TA is applied.

ACell group: An SCell group including an ACell. The ACell group may be composed of only one ACell or composed of one ACell and one or more SCells. Cells within the ACell group may be managed/controlled by the same eNB. Further, cells within the ACell group may be composed of cells to which the same TA as that of the ACell is applied. The ACell may be determined as a cell having a lowest cell index (e.g., ServCell index or SCell index) within the SCell group.

SF: Subframe

While the present invention is described on the basis of inter-site CA, this is for the purpose of describing a case in which per-cell radio resource control/management and common control information transmission, a random access procedure and the like are performed per cell (group) and the present invention is not limited thereto. Accordingly, the present invention can be equally/similarly applied to any case in which per-cell radio resource control/management, common control information transmission, a random access procedure and the like are performed per cell (group)/

In addition, the present invention is applicable to E-PDCCH-based scheduling as well as L-PDCCH-based scheduling. A PDCCH includes both an L-PDCCH and an E-PD- CCH in the present invention unless the L-PDCCH and the E-PDCCH are particularly discriminated from each other.

Figure 12:
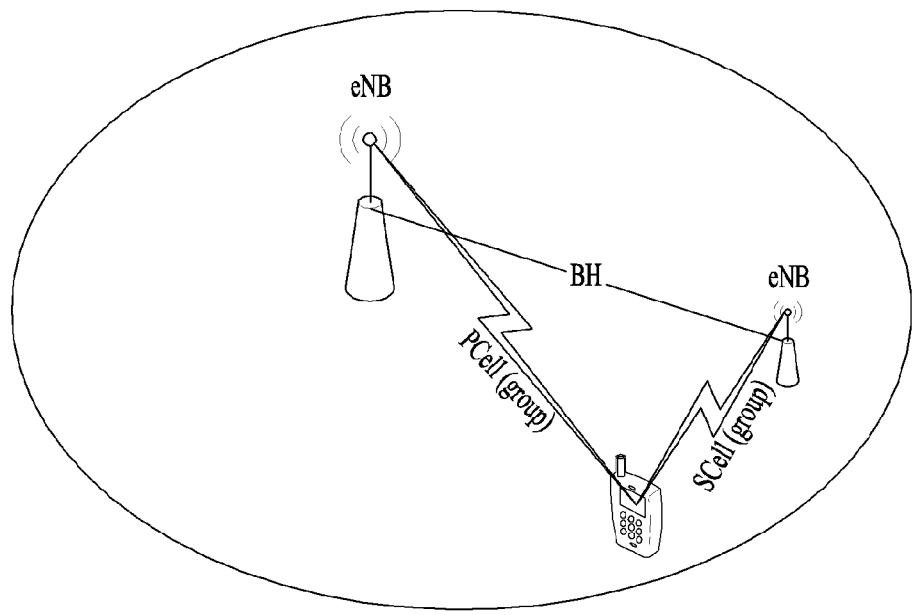
FIG. 12 illustrates a control information transmission method according to the present invention.

FIG. 12 illustrates a control information transmission method according to the present invention. Referring to FIG. 12, a PCell (group) and an SCell (group) may be configured and a CSS may be set in the SCell. In this case, a UE needs to monitor a PCell CSS and the SCell CSS in order to receive control information. To efficiently perform BD in the SCell CSS, it is possible to set whether to perform BD operation and a BD duration or timing. In addition, the present invention provides a method for distributing the number of BD operations (between CSS/USS) per cell or between cells in consideration of the number of BD operations necessary for the SCell CSS. A description will be given of the proposed method on the basis of the SCell CSS. The conventional BD operation can be applied to the PCell CSS unless otherwise mentioned.

BD Timing for SCell CSS

The following method can be considered in order to set whether BD is performed for a CSS transmitted through each cell and a BD duration/timing.

Alt 1: Subframe Set Configuration for CSS BD
(e.g., Periodically Set BD Method)

At least one of whether BD is performed for a CSS transmitted through a cell and a subframe (and/or duration and/or period) in which BD for the CSS of the corresponding cell is performed may be designated per cell. Accordingly, a UE can perform BD only for a CSS in a cell (e.g., ACell) for which CSS BD is set or perform BD for both CSS and USS. Here, only timing/duration at/in which BD for the CSS is performed may be limited to the designated timing/duration, whereas timing/duration at/in which BD for the USS of the corresponding cell may not be limited. For a cell (e.g., SCell) for which CSS BD is not set, the UE can perform BD only for the USS of the corresponding cell, similarly to the conventional method.

Timing/duration, which is set for CSS BD, may include at least one of the following subframes: (i) a subframe in which a PBCH and/or common system/control information such as a (specific) SIB are transmitted in a CSS cell or an arbitrary cell in a cell group to which the CSS cell belongs (or which is configured to be able to transmit the PBCH and/or common system/control information); (ii) a subframe in which a paging signal is transmitted in the CSS cell (or which is configured to be able to transmit the paging signal); and (iii) a subframe (e.g., MBSFN subframe) in which a PDCCH (e.g., MCCH change notification) to which M-RNTI based scrambling is applied is transmitted in the CSS cell (or which is configured to be able to transmit the PDCCH). When the CSS cell is an ACell, a UE can i) skip BD for all DCI formats or 2) skip BD only for a specific DCI format (e.g., DCI format 1C) in a PCell CSS at timing/duration which is set such that CSS BD is performed in the ACell. DCI format 1C is used for PDSCH compact scheduling or MCCH change notification.

In addition, (i) a subframe in which a PBCH and/or common system/control information such as a (specific) SIB are not transmitted in a PCell (or which is not configured to be able to transmit the PBCH and/or common system/ control information), (ii) a subframe in which a paging signal is not transmitted in the PCell (or which is not configured to be able to transmit the paging signal) and/or (iii) a subframe (e.g., non-MBSFN subframe) in which a PDCCH to which M-RNTI based scrambling is applied is not transmitted in the PCell (or which is not configured to be able to transmit the PDCCH) may be designated as BD timing/duration for an SCell CSS. Here, the PCell may be replaced by an arbitrary cell in the PCell group. In this case, the UE can i) skip BD for all DCI formats or 2) skip BD only for a specific DCI format (e.g., DCI format 1C) in the PCell CSS at the BD timing/duration for the SCell CSS.

Alt 2: Event-Triggered Based BD Method

In a state that only whether BD is performed for a CSS transmitted through a corresponding cell is set per cell, CSS BD can be temporarily/restrictedly performed in the corresponding cell only at/in timing/duration at/in which an event is triggered for the corresponding cell (for which CSS BD is set) or an arbitrary cell within the cell group to which the corresponding cell belongs. For example, the UE can perform BD only for a CSS or both the CSS and USS in a cell (e.g., ACell) for which CSS BD is set (temporarily/restrictedly only at/in event-triggered timing/duration). Here, timing/duration at/in which BD for the US of the corresponding cell may not be limited to the event-triggered timing/ duration. For a cell (e.g., SCell) for which CSS BD is not set, the UE can perform BD only for the USS of the corresponding cell, similarly to the conventional method.

The event-triggered timing/duration may include at least one of the following subframe intervals: (i) a predetermined subframe interval following PRACH transmission timing (or PDCCH order reception timing corresponding thereto) in a CSS cell (or an arbitrary cell in the cell group to which the CSS cell belongs) and (ii) a predetermined subframe interval (i.e., interval in which RAR reception (and/or RA-RNTI detection) corresponding to PRACH transmission can be performed (i.e., RAR window)) following SF timing which corresponds to (SF timing at which PRACH transmission is finished)+a specific SF offset (e.g., 3 SFs), in the CSS cell (or an arbitrary cell in the cell group to which the CSS cell belongs). When the CSS cell is an ACell, the UE can skip i) BD for all DCI format or 2) skip only for a specific DCI format (e.g., DCI format 1C) in the PCell CSS at/in timing/ duration at/in which CSS BD is performed in the ACell. DCI format 1C is used for PDSCH compact scheduling or MCCH change notification.

In addition, a subframe, which is not included in an interval in which RAR reception (and/or RA-RNTI detection) corresponding to PRACH transmission can be performed in the PCell, may be designated as BD timing/ duration for the SCell CSS. Here, the PCell may be replaced by an arbitrary cell in the corresponding PCell group/pTAG. In this case, the UE can 1) skip BD for all DCI formats or 2) skip BD for a specific DCI format (e.g., DCI format 1C) at/in BD timing/duration for the SCell CSS.

Alternatively, in the case of a specific SCell (i.e., ACell) designated to detect/receive an RA-RNTI based PDCCH (transmitted through a CSS) or an RAR (scheduled by the PDCCH), an operation (e.g., BD) for detecting a C-RNTI (scheduling the ACell) and/or an SPS C-RNTI based PDCCH (or USS for scheduling of the ACell) may be skipped in the RAR window of the ACell. In this case, the number of BD operations for USSs of cells other than the ACell in the ACell group may not be changed/reduced (e.g., Nu BD operations per cell). This method can be restrictively applied to a non-contention-based PRACH transmission procedure or an (E-)PDCCH order based PRACH transmission procedure.

Meanwhile, a method of dynamically reconfiguring/changing a UL-DL configuration (UD-cfg) for the purpose of interference mitigation and traffic improvement in TDD is considered (the method is referred to as enhanced Interference Mitigation and Traffic Adaptation (eIMTA) hereinafter). In this case, a UD-cfg reconfiguration instruction/command may be transmitted in the form of a UE (group)-common PDCCH through a CSS. When backhaul (signaling) between a PCell and an SCell is not ideal, eIMTA operation may be set in the SCell. In this case, if a UD-cfg reconfiguration command of the SCell is transmitted through the CSS of the PCell by maintaining the conventional scheme, dynamic and effective interference mitigation and traffic adaptation may not be easily performed due to backhaul latency between the PCell and SCell.

Accordingly, in an SCell (SCell #A, for convenience) for which eIMTA operation is set, a UD-cfg reconfiguration command (PDCCH that executes the same) for SCell #A may be configured to be directly received/detected through a CSS of SCell #A or a separately designated cell. In addition, the UD-cfg reconfiguration command (PDCCH that executes the same) for SCell #A may be configured to be directly received/detected through a CSS of a cell (e.g., ACell) which is configured to execute a specific function (e.g., CSS based PDCCH/PDSCH scheduling and/or UCI transmission using a PUCCH) in the cell group to which SCell #A belongs. A UD-cfg reconfiguration command (PDCCH that executes the same) for an arbitrary cell for which eIMTA operation is set in an SCell group may be configured to be transmitted/detected only through a specific cell (e.g., ACell) (configured to execute the aforementioned specific function) in the corresponding cell group. That is, it is possible to set a cell (e.g., PCell, SCell #A, another SCell separately designated or another SCell configured in the cell group to which SCell #A belongs) having a CSS through which a UD-cfg reconfiguration command (PDCCH that executes the same) of a cell for which eIMTA operation is set is received/detected.

Furthermore, for a CSS of a specific SCell, a subframe (and/or interval and/or period) in which BD for receiving/detecting a UD-cfg reconfiguration command of the specific SCell (and/or another SCell) will be performed may be designated. For the specific SCell, the UE may perform BD only for the CSS (in the case of designated timing/duration) or for both the CSS and USS. In this case, 1) BD for all DCI formats may be skipped or 2) BD only for a specific DCI format (e.g., DCI format 1C) may be skipped for the CSS of the PCell at/in BD timing/duration for the SCell CSS.

In addition, a PDCCH for PUSCH/PUCCH transmit power control per UE group (e.g., DCI format 3/3A transmitted based on TPC-PUSCH-RNTI/TPC-PUCCH-RNTI) may be configured to be transmitted only through a specific cell (e.g., configured to perform CSS based PDCCH/PDSCH scheduling and/or UCI transmission using a PUCCH (e.g., ACell)) per cell group. Here, a TPC command indicated through a PDCCH can be applied to determination of transmit power of a PUSCH/PUCCH transmitted through the specific cell (e.g., ACell).

Furthermore, for a CSS of a specific SCell, a subframe (and/or interval and/or period) in which BD for receiving/detecting a PDCCH for UE group PUSCH/PUCCH power control will be performed may be designated. Accordingly, the UE may perform BD only for the CSS (in the case of designated timing/duration) or for both the CSS and USS, for the specific SCell. In this case, 1) BD for all DCI formats may be skipped or 2) BD only for a specific DCI format (e.g., DCI format 1C) may be skipped for the CSS of the PCell at/in BD timing/duration for the SCell CSS.

BD Split with SCell CSS

The number of BD operations (for CSS/USS) per cell or between cells may be distributed as follows in consideration of the number of BD operations necessary for the SCell CSS (at BD timing/duration for the SCell CSS).

Sol 1: Allocation of Nc BD Operations to SCell CSS (BD Distribution Per Cell)

Nc BD operations can be allocated to a CSS of each cell (for which CSS BD is set) and (Nu−Nc) or less (including 0) BD operations can be allocated to a USS of each cell. Alternatively, Nc BD operations can be allocated to a CSS of a specific SCell (for which CSS BD is set) and Nu or less (including 0) BD operations can be allocated to a USS of one, part of or all cells included in the cell group to which the specific SCell belongs (or from among cells other than the specific SCell in the cell group). In this case, a total number of BD operations reallocated to the cell group may be limited such that the total number of BD operations does not exceed (M×Nu) (i.e., (M×Nu) or less). Here, M indicates the number of cells in the cell group. Equivalently, a total number of BD operations reallocated to USSs of the cell group may be limited such that the total number of BD operations does not exceed (M×Nu−Nc) (i.e., (M×Nu−Nc) or less).

When BD is skipped in a USS, BD may be skipped first for a PDCCH candidate having a high CCE AL (in consideration of small coverage of a micro cell). In the case of PDCCH candidates having the same CCE AL, BD for a PDCCH candidate having a smallest/largest CCE index of a specific CCE (e.g., first CCE) constituting the PDCCH candidate may be skipped first or BD for a PDCCH candidate having large CCE overlap with other PDCCH candidates may be skipped first.

Sol 2: Allocation of Nc or Less BD Operations to SCell CSS (BD Distribution Per Cell)

Nc or less (e.g., (Nc−K), K≥1) BD operations can be allocated to a CSS of each cell (for which CSS BD is set) and (Nu−Nc+K) or less (including 0) BD operations can be allocated to a USS of each cell. Alternatively, Nc or less (e.g., (Nc−K), K≥1) BD operations can be allocated to a CSS of a specific SCell (for which CSS BD is set) and Nu or less (including 0) BD operations can be allocated to a USS of one, part of or all cells included in the cell group to which the specific SCell belongs (or from among cells other than the specific SCell in the cell group). In this case, a total number of BD operations reallocated to the cell group may be limited such that the total number of BD operations does not exceed (M×Nu) (i.e., (M×Nu) or less). Here, M indicates the number of cells in the cell group. Equivalently, a total number of BD operations reallocated to USSs of the cell group may be limited such that the total number of BD operations does not exceed (M×Nu−Nc+K) (i.e., (M×Nu−Nc+K) or less).

In each of the CSS and USS, BD for a PDCCH candidate having a high CCE AL may be skipped first. In the case of PDCCH candidates having the same CCE (AL) (belonging to the same SS), BD for a PDCCH candidate having a smallest/largest CCE index of a specific CCE (e.g., first CCE) constituting the PDCCH candidate may be skipped first or BD for a PDCCH candidate having large CCE overlap with other PDCCH candidates may be skipped first.

In Sol 1 and Sol 2, BD may be skipped for all or some E-PDCCH candidates allocated to a specific E-PDCCH set when a USS is composed of multiple (e.g., 2) E-PDCCH sets. An E-PDCCH candidate for which BD is skipped may be determined through a method similar to the aforementioned method (e.g., BD for a PDCCH candidate having a high AL is skipped first). Further, a specific E-PDCCH set for which BD is omitted may be determined as an E-PDCCH set having a lowest/highest index (during E-PDCCH set configuration through RRC), an E-PDCCH set having a smallest number of eCCEs (or PRB pairs) or E-PDCCH candidates, an E-PDCCH having a largest number of high-AL E-PDCCH candidates allocated thereto, or an E-PDCCH set in a localized manner (when E-PDCCH sets have different eCCE mapping properties).

Alternatively, it is possible to consider a method of skipping BD for all or some PDCCH candidates, only for a specific part (e.g., one) of a TM-common DCI format (e.g., DCI format 0/1A), DL TM-dedicated DCI format (e.g., DCI formats 1/1B/1D/2/2A/2B/2C/2D), UL TM-dedicated DCI format (e.g., DCI format 4), for a USS. In this case, a PDCCH candidate for which BD is skipped may be determined by a method similar to the aforementioned method (i.e. method of omitting higher AL first).

Sol 3: Allocation of Nc BD Operation to PCell CSS (Inter-Cell BD Distribution)

Nc BD operations and Nu BD operations can be respectively allocated to a CSS and a USS of a cell for which CSS BD is set, and only (Nu−Ns×Nc) or less (including 0) BD operations can be allocated to PCell USS. Here, Ns indicates the number of SCells for which CSS BD is set. Further, (Nu×Mp−Ns×Nc) or less BD operations can be allocated to the entire USS of a PCell group (all cells belonging thereto). Here, Mp indicates the number of cells in the PCell group. In the USS of the PCell (or PCell group), BD for a PDCCH candidate having a low CCE AL may be omitted first in consideration of large coverage of a macro cell. In the case of PDCCH candidates having the same CCE AL, BD for a PDCCH candidate having a smallest/largest CCE index of a specific CCE (e.g., first CCE) constituting the PDCCH candidate may be skipped first or BD for a PDCCH candidate having large CCE overlap with other PDCCH candidates may be skipped first.

Sol 4: Allocation of Nc or Less BD Operations to PCell CSS (Inter-Cell BD Distribution)

Nc BD operations and Nu BD operations can be respectively allocated to a CSS and a USS of a cell for which CSS BD is set, Nc or less (e.g., (Nc−K), 1≤K≤Nc) (including 0) BD operations can be allocated to PCell CSS, and (Nu−Ns×Nc+K) or less (including 0) BD operations can be allocated to PCell USS. Accordingly, 0 BD operations can be applied to PCell CSS and (Nu−Ns×Nc+Nc) or less BD operations can be allocated to the PCell, or 0 BD operations can be allocated to both PCell CSS and PCell USS (i.e., PDCCH monitoring (e.g., BD) for PCell SS is omitted). Here, Mp indicates the number of cells in the PCell group. In the PCell CSS and the USS for the PCell (or PCell group), BD for a PDCCH candidate having a low CCE AL may be omitted first. In the case of PDCCH candidates having the same CCE AL (belonging to the same SS), BD for a PDCCH candidate having a smallest/largest CCE index of a specific CCE (e.g., first CCE) constituting the PDCCH candidate may be skipped first or BD for a PDCCH candidate having large CCE overlap with other PDCCH candidates may be skipped first. Otherwise, (Nu×Mp−Ns×Nc+K) or less BD operations can be allocated to the entire USS of the PCell group (all cells belonging thereto).

In Sol 3 and Sol 4, BD may be skipped for all or some E-PDCCH candidates allocated to a specific E-PDCCH set when the USS for the PCell (or PCell group) is composed of multiple (e.g., 2) E-PDCCH sets. In this case, an E-PDCCH candidate for which BD is skipped may be determined through a method similar to the aforementioned method (e.g., BD for a PDCCH candidate having a low AL is skipped first). Further, a specific E-PDCCH set for which BD is omitted may be determined as an E-PDCCH set having a lowest/highest index (during E-PDCCH set configuration through RRC), an E-PDCCH set having a smallest number of eCCEs (or PRB pairs) or E-PDCCH candidates, an E-PDCCH having a largest number of low-AL E-PDCCH candidates allocated thereto, or an E-PDCCH set in a localized manner (when E-PDCCH sets have different eCCE mapping properties).

Alternatively, it is possible to consider a method of skipping BD for all or some PDCCH candidates, only for a specific part (e.g., one) of a TM-common DCI format (e.g., DCI format 0/1A), DL TM-dedicated DCI format (e.g., DCI formats 1/1B/1D/2/2A/2B/2C/2D), UL TM-dedicated DCI format (e.g., DCI format 4), for the USS of the PCell (or PCell group) (in the same situation as the above case). In this case, a PDCCH candidate for which BD is skipped may be determined by a method similar to the aforementioned method (e.g., method of omitting BD for a PDCCH candidate having a lower AL).

Here, the PCell may be replaced/configured by/as a specific SCell (e.g., ACell).

Meanwhile, when CSS BD is set for a cell that is not configured in a UL MIMO transmission mode or a specific cell in the cell group to which the cell belongs, a UE for which the UL MIMO transmission mode is supported may not perform per-cell/inter-cell BD distribution exceptionally because the UE still has capability of performing L (e.g., L=16) BD operations for a UL-dedicated DCI format defined for UL MIMO transmission. Accordingly, the UE can respectively perform Nc BD operations and Nu BD operations for the CSS and USS of the corresponding cell (or specific cell for which CSS BD is set) (in the same manner as that for the PCell).

FIG. 13 is a diagram for an example of a base station and a user equipment applicable to the present invention. In case that a system includes a relay, the base station or the user equipment can be replaced by the relay.

Referring to FIG. 13, a wireless communication system includes a base station (BS) 110 and a user equipment (UE) 120. The base station 110 includes a processor 112, a memory 114 and a radio frequency (RF) unit 116. The processor 112 can be configured to implement the procedure and/or methods proposed by the present invention. The memory 114 is connected to the processor 112 and configured to store various information related to the operation of the processor 112. The RF unit 116 is connected to processor 112 and configured to transmit and/or receive a radio signal. The user equipment 120 includes a processor 122, a memory 124 and a radio frequency (RF) unit 126. The processor 122 can be configured to implement the procedure and/or methods proposed by the present invention. The memory 124 is connected to the processor 122 and configured to store various information related to the operation of the processor 122. The RF unit 126 is connected to the processor 122 and configured to transmit and/or receive a radio signal. The base station 110 and/or the user equipment 120 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the signal transmission/reception relations between a user equipment and a base station. In this disclosure, a specific operation explained as performed by a base station can be occasionally performed by an upper node of the base station. In particular, in a network constructed with a plurality of network nodes including a base station, it is apparent that various operations performed for communication with a user equipment can be performed by a base station or other networks except the base station. In this case, 'base station' can be replaced by such a terminology as a fixed station, a Node B, an eNode B (eNB), an access point, and the like. And, 'user equipment' can be replaced by such a terminology as a user equipment (UE), a mobile station (MS), a mobile subscriber station (MSS) and the like.

Embodiments of the present invention can be implemented using various means. For instance, embodiments of the present invention can be implemented using hardware, firmware, software and/or any combinations thereof. In case of the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Accordingly, the present invention can be used by such a wireless communication device as a user equipment device, a relay, a base station, and the like.

The invention claimed is:

1. A method for receiving, by a User Equipment (UE), control information in a wireless communication system, comprising:
    configuring a primary cell (PCell) and a secondary cell (SCell); and monitoring a plurality of control channel candidates within a search space for receiving the control information in subframe #n in the SCell,
    wherein, when the subframe #n is included in a specific subframe set, the search space includes a common search space (CSS) of the SCell, and a process of monitoring control channel candidates with a downlink control information (DCI) format 1C is skipped from a CSS of the PCell in subframe #n,
    wherein, when the subframe #n is not included in the specific subframe set, the search space includes only a user-specific search space (USS),
    wherein the DCI format 1C is used for Physical Downlink Shared Channel (PDSCH) compact scheduling or Multimedia Control Channel (MCCH) change notification.

2. The method according to claim 1, wherein the specific subframe set includes a plurality of periodically configured subframe patterns.

3. The method according to claim 1, wherein the specific subframe set includes at least one of the following:
    (i) a subframe configured to transmit system information in the SCell or a cell group including the SCell;
    (ii) a subframe configured to transmit a paging signal in the SCell; or
    (iii) a multicast broadcast single frequency network (MBSFN) subframe in the SCell.

4. The method according to claim 3, wherein the specific subframe set includes at least one of the following:
    (i) a subframe configured not to transmit system information in the PCell;
    (ii) a subframe configured not to transmit a paging signal in the PCell; or
    (iii) a non-MBSFN subframe in the PCell.

5. The method according to claim 1, wherein the specific subframe set includes a random access response (RAR) window for a physical random access channel (PRACH) signal transmitted from the SCell or the cell group including the SCell.

6. A User Equipment (UE) configured to receive control information in a wireless communication system, comprising: a radio frequency (RF) unit; and a processor,
    wherein the processor is configured to configure a primary cell (PCell) and a secondary cell (SCell) and to monitor a plurality of control channel candidates within a search space for receiving the control information in subframe #n in the SCell,
    wherein, when the subframe #n is included in a specific subframe set, the search space includes a common search space (CSS) of the SCell, and a process of monitoring control channel candidates with a downlink control information (DCI) format 1C is skipped from a CSS of the PCell in subframe #n, wherein, when the subframe #n is not included in the specific subframe set, the search space includes only a user-specific search space (USS), wherein the DCI format 1C is used for Physical Downlink Shared Channel (PDSCH) compact scheduling or Multimedia Control Channel (MCCH) change notification.

7. The UE according to claim 6, wherein the specific subframe set includes a plurality of periodically configured subframe patterns.

8. The UE according to claim 6, wherein the specific subframe set includes at least one of the following:
   (i) a subframe configured to transmit system information in the SCell or a cell group including the SCell;
   (ii) a subframe configured to transmit a paging signal in the SCell; or
   (iii) a multicast broadcast single frequency network (MBSFN) subframe in the SCell.

9. The UE according to claim 8, wherein the specific subframe set includes at least one of the following:
   (i) a subframe configured not to transmit system information in the PCell;
   (ii) a subframe configured not to transmit a paging signal in the PCell; or
   (iii) a non-MBSFN subframe in the PCell.

10. The UE according to claim 8, wherein the specific subframe set includes a random access response (RAR) window for a physical random access channel (PRACH) signal transmitted from the SCell or the cell group including the SCell.

* * * * *